United States Patent
Drerup et al.

(10) Patent No.: US 12,536,571 B2
(45) Date of Patent: Jan. 27, 2026

(54) DYNAMIC SERVICE QUALITY ADJUSTMENTS BASED ON CAUSAL ESTIMATES OF SERVICE QUALITY SENSITIVITY

(71) Applicant: Maplebear Inc., San Francisco, CA (US)

(72) Inventors: Tilman Drerup, Palo Alto, CA (US); Zhida Gui, Sunnyvale, CA (US); Michael Kurish, Perkasie, PA (US)

(73) Assignee: Maplebear Inc., San Francisco, CA (US)

( * ) Notice: Subject to any disclaimer, the term of this patent is extended or adjusted under 35 U.S.C. 154(b) by 211 days.

(21) Appl. No.: 18/204,207

(22) Filed: May 31, 2023

(65) Prior Publication Data
US 2024/0403929 A1    Dec. 5, 2024

(51) Int. Cl.
| | |
|---|---|
| *G06Q 30/06* | (2023.01) |
| *G06Q 10/0631* | (2023.01) |
| *G06Q 10/0639* | (2023.01) |
| *G06Q 30/0601* | (2023.01) |
| *G06Q 10/08* | (2023.01) |

(52) U.S. Cl.
CPC ... *G06Q 30/0617* (2013.01); *G06Q 10/06315* (2013.01); *G06Q 10/06395* (2013.01); *G06Q 10/08* (2013.01)

(58) Field of Classification Search
CPC ......... G06Q 30/0617; G06Q 10/06315; G06Q 10/06395; G06Q 10/08
See application file for complete search history.

(56) References Cited

U.S. PATENT DOCUMENTS

| | | | | |
|---|---|---|---|---|
| 2019/0236740 | A1* | 8/2019 | Rao | G06Q 10/06315 |
| 2019/0266555 | A1* | 8/2019 | Rajkhowa | G06Q 10/06312 |
| 2020/0293374 | A1* | 9/2020 | Phuke | G06Q 10/06311 |
| 2021/0142391 | A1* | 5/2021 | van Horne | G06F 3/04842 |
| 2021/0373940 | A1* | 12/2021 | Will | G06F 9/5027 |
| 2023/0089904 | A1* | 3/2023 | Prasad | G06N 7/01 705/7.29 |
| 2023/0164049 | A1* | 5/2023 | Samadi | H04W 16/22 |

FOREIGN PATENT DOCUMENTS

| | | | | |
|---|---|---|---|---|
| CA | 2966075 A1 * | 5/2016 | | G06Q 10/04 |
| CN | 107451763 A * | 12/2017 | | G06Q 10/083 |
| WO | WO-2020034044 A1 * | 2/2020 | | |

OTHER PUBLICATIONS

Rzepakowski P, Jaroszewicz S. Uplift modeling in direct marketing. Journal of telecommunications and information technology. 2012:43-50. (Year: 2012).*

Liu Z, Wang D, Yu Q, Zhang Z, Shen Y, Ma J, Zhong W, Gu J, Zhou J, Yang S, Qi Y. Graph representation learning for merchant incentive optimization in mobile payment marketing. InProceedings of the 28th ACM International Conference on Information and Knowledge Management Nov. 3, 2019 (pp. 2577-2584). (Year: 2019).*

\* cited by examiner

*Primary Examiner* — Hamzeh Obaid
(74) *Attorney, Agent, or Firm* — Fenwick & West LLP

(57) ABSTRACT

An online system, such as a concierge service, provides services to users using a set of limited resources. To allocate the limited resources of the system among the users, the system uses a model to predict each user's sensitivity to different levels of service. An allocation module then allocates the limited resources among a set of users based in part on the estimated sensitivities and the supply of available resources.

17 Claims, 4 Drawing Sheets

DYNAMIC SERVICE QUALITY ADJUSTMENTS BASED ON CAUSAL ESTIMATES OF SERVICE QUALITY SENSITIVITY

BACKGROUND

In an online concierge system, customers may select items for ordering, procurement, and delivery from physical retailers or other warehouses. A significant challenge in such a system is efficiently allocating staff and other service resources to servicing customer orders.

SUMMARY

In accordance with one or more aspects of the disclosure, an online concierge system receives orders from customers via a customer application, assigns the orders to available pickers to procure items from a warehouse, and facilitates deliveries of the orders to the customers. The online concierge system furthermore intelligently allocates a limited supply of service resources to service tasks for customers based on estimated service quality sensitivities of customers. In an example process, the online concierge system obtains a machine learning model trained based on historical data to map characteristics of customers to estimated sensitivities to service quality. For a population of users, the online concierge system applies the machine learning model to estimate respective service quality sensitivities. The online concierge system also obtains supply data indicative of a supply of service resources available to fulfill orders from the population of users. The online concierge system applies an allocation model to determine an allocation of the supply of service resources to the orders from the population of users based at least in part on the respective service quality sensitivities for the population of users. The online concierge system then facilitates fulfillment of the orders according to the allocation.

In one or more embodiments, the machine learning model may be trained in a training phase. The online concierge system obtains user characteristics for a set of users in a training population. The online concierge system also obtains one or more success metrics for evaluating the allocation of the supply of service resources. The online concierge system further obtains training data associated with performing services for the set of users in the training population in accordance with the different service qualities and observing the one or more success metrics. The online concierge system then trains an uplift model to learn model parameters indicative of causal relationships between the different service qualities and the one or more success metrics dependent on the user characteristics.

In one or more embodiments, obtaining the training data may comprise determining assignments of different groups of the set of users in the training population to the different service qualities, performing services based on the assignments, and observing the success metrics resulting from the services.

In one or more embodiments, the success metrics comprise at least one of: sales, conversion rate, or gross merchandise value.

In one or more embodiments, applying the allocation model comprises applying a constrained optimization model to optimize the allocation according to an optimization metric.

In one or more embodiments, applying the allocation model comprises applying a queueing algorithm to determine assignments of the supply of service resources on a per order basis.

In one or more embodiments, the orders from the population of users associated with the allocation are obtained for at least one of: a predefined past time window of placed orders, a future time window of scheduled orders, and a predicted set of future orders during a future time window.

In one or more embodiments, the allocation comprises an assignment per user to one or more of the supply of service resources.

In another aspect, a computer system includes one or more processors and a non-transitory computer-readable storage medium that stores instructions executable by the one or more processors for performing any of the methods described above.

DETAILED DESCRIPTION

Figure 1:
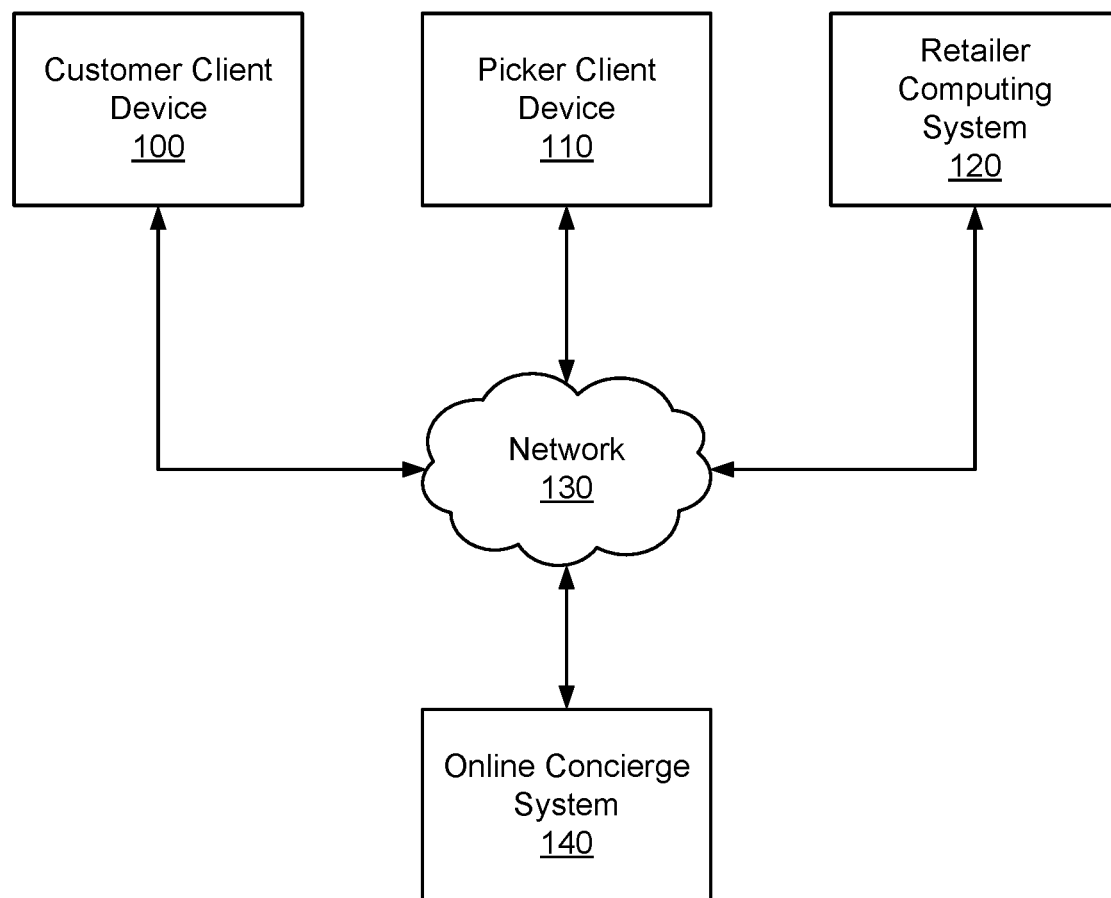
FIG. 1 illustrates an example system environment for an online concierge system, in accordance with one or more embodiments.

FIG. 1 illustrates one or more embodiments of a system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
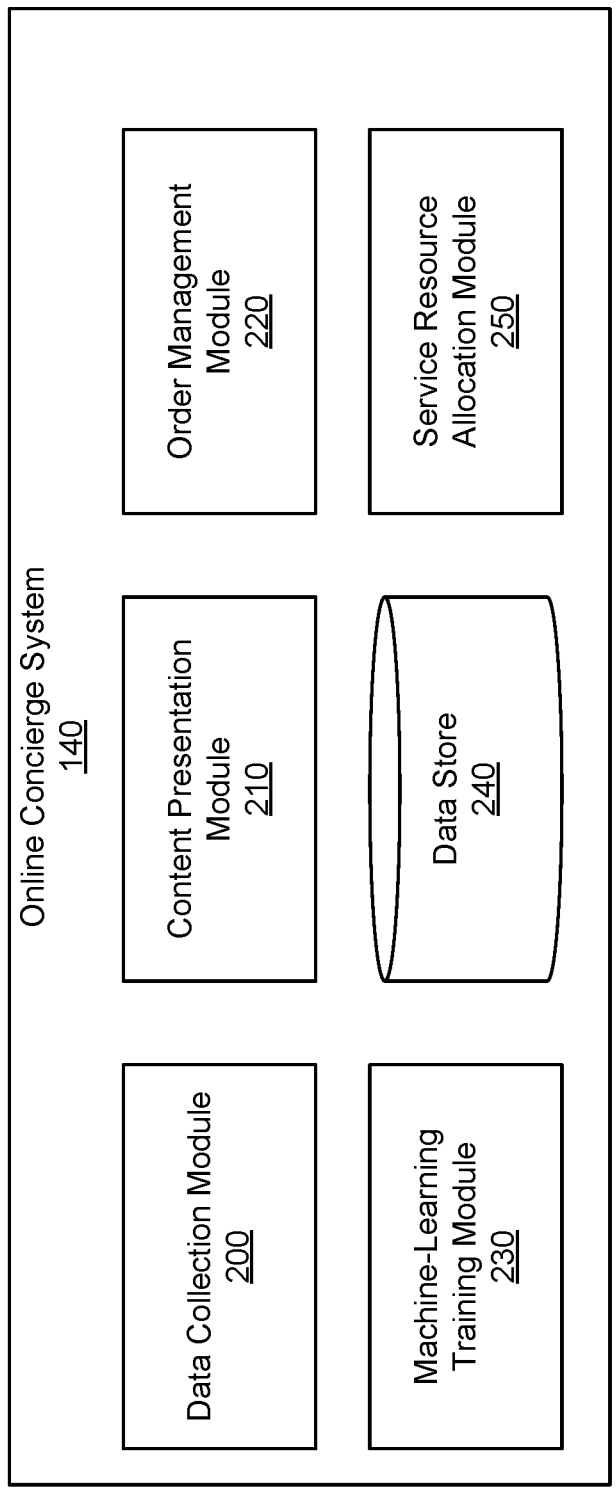
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, and a service resource allocation module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

These service resource allocation module 250 allocates service resources to customers to fulfill orders or other customer service tasks. Service resources may be available to fulfill a task associated with varying quality levels such as, for example, standard service, enhanced service, premium service. In order to determine how to allocate a limited set of resources in different service quality levels to tasks, the service resource allocation module 250 estimates service quality level sensitivity of customers associated with orders, and then intelligently allocates the service resources in different service level categories to fulfill orders based in part on the sensitivities. For example, customers that respond most favorably to receiving premium service quality may be more frequently assigned service resources associated with premium tier service, while customers that do not respond significantly differently to standard or premium service levels may be more frequently assigned to standard service quality levels. One or more embodiments of a service resource allocation module 250 are described in further detail below with respect to FIG. 3.

Figure 3:
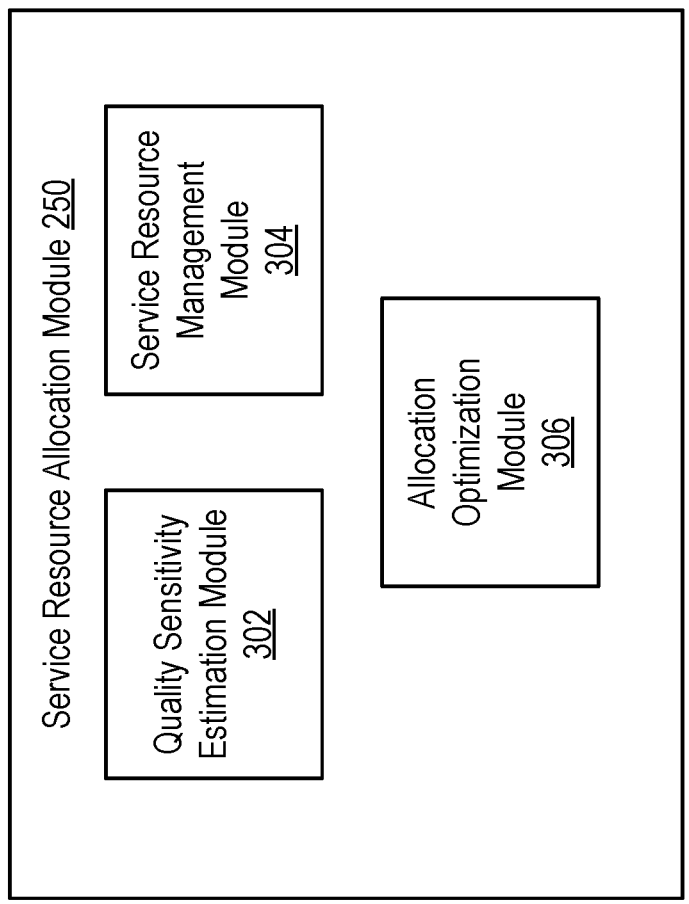
FIG. 3 is a block diagram illustrating one or more embodiments of a service resource allocation module for an online concierge system.

FIG. 3 illustrates one or more embodiments of a service resource allocation module 250 in accordance with one or more embodiments. The service resource allocation module 250 comprises a quality sensitivity estimation module 302, a service resource management module 304, and an allocation optimization module 306. In other embodiments, the service resource allocation module 250 may comprise different or additional modules.

The quality sensitivity estimation module 302 estimates, on a per user basis, a sensitivity of the user to differences in quality of services associated with various service tasks performed by service resources of the online concierge system 140. The service resources may comprise human staff such as pickers, delivery drivers, customer service representatives, shopping assistants, etc. The service resources may furthermore comprise various automated or electronic resources such as robotic pickers and/or delivery systems, customer service bots, or other electronic resources utilized to serve customers.

The quality of service associated with different service tasks may be characterized in various ways. For example, in one or more embodiments, quality of service may be based on the service resources assigned to service a particular task. In one example, service resources may be rated based on subjective feedback provided by users. Different service resources may then be assigned quality scores or quality categories (e.g., standard, elevated, or premium) based on the ratings. In other embodiments, the service resources may be assigned quality scores based on objective measures. For example, a picker may be assigned a quality score based on average picking time, picking accuracy, number of orders fulfilled, years of experience, or a combination of objective measures. In further embodiments, resources may be assigned quality scores or quality categories based on a combination of subjective and objective measures.

In further embodiments, a quality of service associated with fulfilling a task may relate to a selected service technique. For example, for a customer service request, different service quality levels may be assessed depending on whether the task is fulfilled by a human representative or an automated system. For picking items, different service qualities may be associated with controllable factors such as how quickly resources are dispatched to fulfill the order, an urgency level associated with the order, a level of quality checking associated with items selected for the order, the type of delivery vehicle used to fulfill orders, whether orders are hand delivered or left at the doorstep, a frequency of notifications provided to the customer relating to status of the order, etc. In one or more other embodiments, the quality of service is measured using an output of a machine learning model, such as an estimated delivery time.

The per user sensitivity may be characterized, for example, as a sensitivity score that indicates how sensitive the user is to variations in service quality. For example, some users (with low sensitivities) may utilize the online concierge system 140 in substantially the same way regardless of whether or not they receive service associated with standard, elevated, or premium level quality scores. In contrast, other users (with high sensitivities) may respond positively to services with elevated quality scores and/or respond negatively to services with standard quality scores. For example, some users may shop more frequently and/or spend more money when receiving higher quality services.

In one or more embodiments, the quality sensitivities may be characterized with respect to a success metric such that the quality sensitivity score is indicative of the change in the success metric in response to a change in quality of service received. The success metric may be based on various business metrics such as conversion rate associated with the customer, gross merchandise value associated with the customer, number of orders placed by the customer, number of items ordered by the customer, dollar amount of orders placed by the customer, frequency of ordering by the customer, number of referrals provided by the customer, ratings or other feedback provided by the customer, or other success-based metrics or a combination thereof. Thus, for example, the success metric associated with a customer with high quality sensitivity may change considerably depending on quality of service received, while the success metric associated with a customer with low quality sensitivity may remain relatively stable regardless of service quality received.

The quality sensitivity estimation module 302 may estimate the quality sensitivity of a customer based on a machine learning model trained to map user characteristics of the customer to estimated sensitivity scores. An example of such a machine learning model may comprise an uplift model. To train the model, the quality sensitivity estimation module 302 may obtain historical data including user characteristics of users receiving services from the online concierge system 140, the quality of services received, and the resulting success metrics. The training process then learns how to map an input set of user characteristics to sensitivity scores. User characteristics may include, for example, demographic information associated with the user, location information, metrics characterizing historical orders associated with the user (e.g., number of orders, dollar value of orders, frequency of orders, etc.), ratings or other feedback provided by the user, or other characteristics that may be relevant to estimating quality sensitivity.

In one or more embodiments, in order to generate useful data for training the machine learning model, customers may be assigned different quality of service levels in a manner that results in a random or quasi-random distribution. For example, in one or more embodiments, a user may be assigned different service levels (such as, for example, standard, elevated, and premium) at random. The relative proportion of users assigned to each group may be determined in part by a controllable parameter. For example, (x/2) % of customers may be assigned to a standard service quality group, (x/2) % of customers may be assigned to an elevated service quality group, and (100−x) % of customers may be assigned to a premium quality service group, where x is a configurable parameter. In other embodiments, different types of distribution functions may be employed. In one or more embodiments, a random subset of customers may be assigned a service quality in this way for the purpose of generating additional training data, while other customers are assigned service quality based on an allocation function described in further detail below.

Once the machine learning model is trained, the quality sensitivity estimation module 302 may apply the machine learning model to a set of user characteristics of a user to estimate the user's sensitivity to quality of service. The machine learning model may be trained and applied using any of the techniques described above with respect to the machine learning training module 230.

The service resource management module 304 obtains information to characterize service resources available for fulfilling service requests (e.g., orders) for customers of the online concierge system 140. In one or more embodiments, the service resource management module 304 may be integrated with a human resource management system, inventory management system, or other management system that stores data about available resources. For a set of orders, the service resource management module 304 may identify, for each service quality category, supplies of resources available to fulfill the orders. For example, for a set of 10 orders, the service resource management module 304 may identify a supply sufficient to fulfill 6 orders with premium service quality, 3 orders with elevated service quality, and 1 order with standard service quality. In other embodiments, the service resource management module 304 may characterize the available supplies as a distribution of service quality scores without necessarily determining specific counts. In yet further embodiments, the service resource management module 304 may characterize service resource availability at least based in part on associated cost of deploying those resources using different quality levels. For example, for a given order, the service resource management module 304 may characterize the respective costs of fulfilling the order with standard service quality, elevated service quality, and premium service quality.

The allocation optimization module 306 allocates service resources to fulfill service tasks associated with orders based in part on the user-level service quality sensitivities for a set of orders and the supply of services of different qualities available to service the set of orders. Here, the allocation optimization module 306 may perform the allocation with respect to a set of orders for a recent time window, for a future time window of scheduled orders, for a set of predicted orders during a future time window, or some other set of orders. In one or more embodiments, the allocation may furthermore be geographically limited to orders within a certain geographic area or a specific retailer. The allocation optimization module 306 may determine the allocation based on an allocation model that executes a constrained optimization algorithm for optimizing an optimization metric. The optimization metric may be the same as the success metric described above, or may comprise a different metric. The optimization metric may be based on factors such as, for example, a conversion rate, a gross merchandise value, a number of orders placed, a number of items ordered, a dollar amount of orders, a frequency of ordering, a number of referrals provided by customers, ratings or other feedback provided by customers, or other metric or a combination thereof.

The allocation optimization module 306 outputs assignments of service resources to service tasks in a manner that optimizes the optimization metric. Generally, the allocation optimization module 306 will operate such that customers that are highly sensitive to quality of service tend to be allocated resources for higher quality of service while customers that are not sensitive to quality of service tend to be allocated the remaining resources, which may more frequently result in standard quality of service instead of elevated or premium service In this manner, the online concierge system 140 can optimize the allocation within the constraints of the available supply of limited resources.

In an alternative embodiment, the allocation optimization module 306 may execute a queueing system that assigns resources on a per customer basis as orders come in, instead of necessarily allocating resources for a batch of orders concurrently. In this embodiment, the queueing system assigns resources to an order based on the customer's estimated quality sensitivity, the real-time resource availability, and a feedback parameter relating to prior assignments. The feedback parameter may be updated after each assignment such that subsequent assignments are affected by the past allocations. Over a period of time, the queueing system may achieve optimized allocations similar to the constrained optimization model described above.

Figure 4:
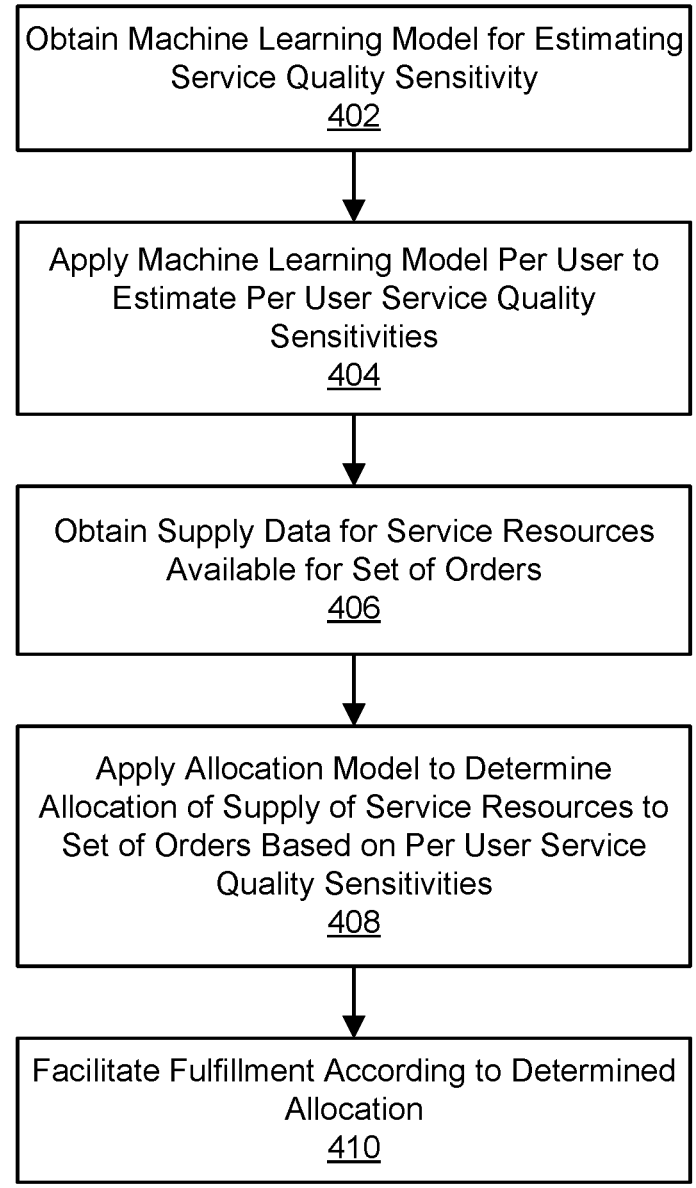
FIG. 4 is a flowchart illustrating one or more embodiments of a process for allocating service resources to service tasks in an online concierge system.

FIG. 4 is a flowchart for a method of allocating service resources to service tasks in an online concierge system 140, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

The online concierge system 140 obtains 402 a machine learning model trained on historical data that is trained to map characteristics of customers to estimated sensitivities to service quality. The machine learning model may be obtained from a training process as described above. For example, in a training phase, the online concierge system 140 may obtain user characteristics for a set of users in a training population and identify one or more success metrics for evaluating an allocation of services (e.g., sales, conversion rate, and gross merchandise value, etc.). The online concierge system 140 may furthermore obtain training data associated with performing the services for the set of users in the training population in accordance with the different service qualities and the observed success metrics. An uplift model may then be trained to learn model parameters indicative of an inferred causal relationship between the service qualities received by users having certain user characteristics and the one or more success metrics. For example, the uplift model may learn that the success metric observed with respect to a first group of users (e.g., having certain demographics, ordering patterns, or other characteristics) is not strongly affected by the service quality received while the success metric observed with respect to a second group of users (e.g., have different demographics, ordering patterns, or other characteristics) is strongly correlated with receiving higher service quality. The uplift model may therefore learn that the second group of users is more sensitive to service quality than the first group of users.

In one or more embodiments, the training data may be obtained in part by determining assignments of service resources associated with varying service qualities to different users in a manner that results in historical data sufficient to train the uplift model. For example, within a population of users having similar user characteristics, the online concierge system 140 may allocate resources in a training phase to ensure a desired distribution of service quality within the population. In one or more embodiments, only a subset of orders (which may be randomly selected) may have service qualities assigned for this purpose while other orders are assigned service qualities based on the output of the allocation model described herein. In other embodiments, the training data may be obtained from historical observations without the online concierge system 140 necessarily influencing the assigned service resources for the purpose of generating training data for training the uplift model. In yet further embodiments, training data may be derived from simulations of the online concierge system 140 and/or a combination of actual historical data and simulations.

For a population of users, the online concierge system 140 applies 404 the machine learning model to estimate respective service quality sensitivities per user for the population of users. The online concierge system 140 obtains 406 supply data indicative of a supply of service resources available to fulfill a set of orders from the population of users. The set of orders may relate to, for example, a predefined past time window of placed orders, a future time window of scheduled orders, and a predicted set of future orders during a future time window.

The online concierge system 140 applies 408 the allocation model to determine an allocation of the supply of service resources to the orders from the population of users based at least in part on the respective service quality sensitivities for the population of users. The allocation model may comprise, for example, a constrained optimization model that optimizes the allocation of service resources according to an optimization metric. The optimization metric may be based on various success metrics associated with operation of the online concierge system 140 such as, for example, sales, conversion rate, and gross merchandise value, etc. Alternatively, a queuing system may be used to perform the allocation. The online concierge system 140 then facilitates 410 fulfillment of the orders according to the allocation.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   accessing an uplift machine learning model trained to map characteristics of users related to estimated sensitivities to a service quality using historical data associated with an online system including metrics characterizing historical orders associated with the users, wherein the online system receives orders from the users via a user application, assigns the orders to available pickers to procure items from a warehouse, and facilitates deliveries of the orders to the users, wherein the uplift machine learning model is trained by:
   obtaining user characteristics for a set of users in a training population,
   obtaining one or more success metrics for evaluating an allocation of a supply of service resources,
   obtaining training data associated with performing services for the set of users in the training population in accordance with different service qualities and observing the one or more success metrics, and
   training, using the training data, the uplift machine learning model to learn model parameters indicative of causal relationships between assignments of the different service qualities and the one or more success metrics dependent on the user characteristics;
   applying the uplift machine learning model to estimate respective service quality sensitivities for a population of users;
   obtaining supply data indicative of a real time supply of service resources available to fulfill a plurality of orders from the population of users, the real time supply of service resources including a set of pickers, wherein each picker from the set of pickers is a fully-autonomous robot;
   applying, in real time, an allocation machine learning model to information about the respective service quality sensitivities for the population of users and information related to prior allocations of available automated or electronic resources for servicing a set of orders to allocate the real time supply of service resources to the plurality of orders; and
   communicating, in real time, the plurality of orders to the service resources to facilitate fulfillment of the orders according to the allocation inferred in real time by the allocation machine learning model, communicating the plurality of orders causes each picker from the set of pickers operating as the fully-autonomous robot to collect, in the warehouse, items for a respective order of the plurality of orders.

2. The method of claim 1, wherein obtaining the training data comprises:
   determining assignments of different groups of the set of users in the training population to the different service qualities;
   performing services based on the assignments; and
   observing the one or more success metrics resulting from the services.

3. The method of claim 1, wherein the one or more success metrics comprise one or more of: sales, a conversion rate, or a gross merchandise value.

4. The method of claim 1, wherein applying the allocation machine learning model comprises:
   applying a constrained optimization model to optimize the allocation according to an optimization metric.

5. The method of claim 1, wherein the plurality of orders from the population of users are obtained for one or more of: a predefined past time window of placed orders, a future time window of scheduled orders, or a predicted set of future orders during a future time window.

6. The method of claim 1, wherein the allocation comprises an assignment per user to one or more of the supply of service resources.

7. The method of claim 1, wherein applying the allocation machine learning model comprises applying a queueing algorithm to determine assignments of the supply of service resources on a per order basis.

8. A non-transitory computer-readable storage medium storing instructions executable by one or more processors for performing steps comprising:
   accessing an uplift machine learning model trained to map characteristics of users related to estimated sensitivities to a service quality using historical data associated with an online system including metrics characterizing historical orders associated with the users, wherein the online system receives orders from the users via a user application, assigns the orders to available pickers to procure items from a warehouse, and facilitates deliveries of the orders to the users, wherein the uplift machine learning model is trained by:
   obtaining user characteristics for a set of users in a training population,
   obtaining one or more success metrics for evaluating an allocation of a supply of service resources,
   obtaining training data associated with performing services for the set of users in the training population in accordance with different service qualities and observing the one or more success metrics, and
   training, using the training data, the uplift machine learning model to learn model parameters indicative of causal relationships between assignments of the different service qualities and the one or more success metrics dependent on the user characteristics;
   applying the uplift machine learning model to estimate respective service quality sensitivities for a population of users;

obtaining supply data indicative of a real time supply of service resources available to fulfill a plurality of orders from the population of users, the real time supply of service resources including a set of pickers, wherein each picker from the set of pickers is a fully-autonomous robot;

applying, in real time, an allocation machine learning model to information about the respective service quality sensitivities for the population of users and information related to prior allocations of available automated or electronic resources for servicing a set of orders to allocate the real time supply of service resources to the plurality of orders; and communicating, in real time, the plurality of orders to the service resources to facilitate fulfillment of the orders according to the allocation inferred in real time by the allocation machine learning model, communicating the plurality of orders causes each picker from the set of pickers operating as the fully-autonomous robot to collect, in the warehouse, items for a respective order of the plurality of orders.

9. The non-transitory computer-readable storage medium of claim 8, wherein obtaining the training data comprises:
determining assignments of different groups of the set of users in the training population to the different service qualities;
performing services based on the assignments; and
observing the one or more success metrics resulting from the services.

10. The non-transitory computer-readable storage medium of claim 8, wherein the one or more success metrics comprise one or more of: sales, a conversion rate, or a gross merchandise value.

11. The non-transitory computer-readable storage medium of claim 8, wherein applying the allocation machine learning model comprises:
applying a constrained optimization model to optimize the allocation according to an optimization metric.

12. The non-transitory computer-readable storage medium of claim 8, wherein the plurality of orders from the population of users are obtained for one or more of: a predefined past time window of placed orders, a future time window of scheduled orders, or a predicted set of future orders during a future time window.

13. The non-transitory computer-readable storage medium of claim 8, wherein the allocation comprises an assignment per user to one or more of the supply of service resources.

14. The non-transitory computer-readable storage medium of claim 8, wherein applying the allocation machine learning model comprises applying a queueing algorithm to determine assignments of the supply of service resources on a per order basis.

15. A computer system comprising:
one or more processors; and
a non-transitory computer-readable storage medium storing instructions executable by the one or more processors for performing steps including:

accessing an uplift machine learning model trained to map characteristics of users related to estimated sensitivities to a service quality using historical data associated with an online system including metrics characterizing historical orders associated with the users, wherein the online system receives orders from the users via a user application, assigns the orders to available pickers to procure items from a warehouse, and facilitates deliveries of the orders to the users, wherein the uplift machine learning model is trained by:
obtaining user characteristics for a set of users in a training population,
obtaining one or more success metrics for evaluating an allocation of a supply of service resources,
obtaining training data associated with performing services for the set of users in the training population in accordance with different service qualities and observing the one or more success metrics, and
training, using the training data, the uplift machine learning model to learn model parameters indicative of causal relationships between assignments of the different service qualities and the one or more success metrics dependent on the user characteristics;

applying the uplift machine learning model to estimate respective service quality sensitivities for a population of users;

obtaining supply data indicative of a real time supply of service resources available to fulfill a plurality of orders from the population of users, the real time supply of service resources including a set of pickers, wherein each picker from the set of pickers is a fully-autonomous robot;

applying, in real time, an allocation machine learning model to information about the respective service quality sensitivities for the population of users and information related to prior allocations of available supply automated or electronic resources for servicing a set of orders to allocate the real time supply of service resources to the plurality of orders; and communicating, in real time, the plurality of orders to the service resources to facilitate fulfillment of the orders according to the allocation inferred in real time by the allocation machine learning model, communicating the plurality of orders causes each picker from the set of pickers operating as the fully-autonomous robot to collect, in the warehouse, items for a respective order of the plurality of orders.

16. The computer system of claim 15, wherein obtaining the training data comprises:
determining assignments of different groups of the set of users in the training population to the different service qualities;
performing services based on the assignments; and
observing the one or more success metrics resulting from the services.

17. The computer system of claim 15, wherein the one or more success metrics comprise one or more of: sales, a conversion rate, or a gross merchandise value.

* * * * *